US010554732B2

(12) United States Patent
Homma et al.

(10) Patent No.: US 10,554,732 B2
(45) Date of Patent: Feb. 4, 2020

(54) REMOTE COMMUNICATION SYSTEM, COMMUNICATION TERMINAL, AND EXTENDED FUNCTION PROVIDING METHOD

(71) Applicants: Takeshi Homma, Kanagawa (JP); Hideki Shiro, Kanagawa (JP); Takashi Hasegawa, Kanagawa (JP); Takeshi Fujita, Tokyo (JP)

(72) Inventors: Takeshi Homma, Kanagawa (JP); Hideki Shiro, Kanagawa (JP); Takashi Hasegawa, Kanagawa (JP); Takeshi Fujita, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 95 days.

(21) Appl. No.: 15/398,095

(22) Filed: Jan. 4, 2017

(65) Prior Publication Data
US 2017/0264671 A1 Sep. 14, 2017

(30) Foreign Application Priority Data

Mar. 11, 2016 (JP) ................................ 2016-048246

(51) Int. Cl.
*G06F 15/16* (2006.01)
*H04L 29/08* (2006.01)
(Continued)

(52) U.S. Cl.
CPC ............ *H04L 67/10* (2013.01); *G06F 3/1222* (2013.01); *G06F 3/1238* (2013.01);
(Continued)

(58) Field of Classification Search
CPC .... G06F 3/1222; G06F 3/1238; G06F 3/1288; H04L 67/025; H04L 67/04; H04L 67/10; H04L 67/303; H04L 67/40; H04L 67/42
See application file for complete search history.

(56) References Cited

U.S. PATENT DOCUMENTS 9,001,370 B1   4/2015   Nuggehalli
9,247,206 B2   1/2016   Homma
(Continued)

FOREIGN PATENT DOCUMENTS

EP   2 493 413 A1   8/2012
EP   2 874 089 A1   5/2015
(Continued)

OTHER PUBLICATIONS

U.S. Appl. No. 15/187,240, filed Jun. 20, 2016.
(Continued)

*Primary Examiner* — Normin Abedin
(74) *Attorney, Agent, or Firm* — Oblon, McClelland, Maier & Neustadt, L.L.P.

(57) ABSTRACT

A remote communication system includes: a first communication terminal configured to establish a call session for transmitting and receiving at least a voice with a target communication terminal, and to communicate with the target communication terminal; and a second communication terminal configured to participate in the call session. The second communication terminal provides a given function that is not limited to a telephone call to one of the first communication terminal and the target communication terminal, in response to a request from one of a user of the second communication terminal, the first communication terminal, and the target communication terminal.

6 Claims, 12 Drawing Sheets

(51) Int. Cl.
  *H04L 29/06* (2006.01)
  *G06F 3/12* (2006.01)

(52) U.S. Cl.
  CPC .......... *G06F 3/1288* (2013.01); *H04L 67/025* (2013.01); *H04L 67/04* (2013.01); *H04L 67/303* (2013.01); *H04L 67/40* (2013.01); *H04L 67/42* (2013.01)

(56) References Cited

U.S. PATENT DOCUMENTS

| | | |
|---|---|---|
| 9,398,252 B2 | 7/2016 | Homma |
| 2012/0099146 A1 | 4/2012 | Stokes et al. |
| 2013/0003106 A1* | 1/2013 | Nishida .................. G06F 3/1222 358/1.14 |
| 2013/0179961 A1 | 7/2013 | Abe |
| 2014/0002836 A1 | 1/2014 | Ishino et al. |
| 2014/0201759 A1* | 7/2014 | Amikura ............... G06F 3/1206 718/106 |
| 2014/0244720 A1 | 8/2014 | Knodt et al. |
| 2014/0245173 A1 | 8/2014 | Knodt et al. |
| 2014/0245185 A1 | 8/2014 | Knodt et al. |
| 2014/0247471 A1 | 9/2014 | Stokes et al. |
| 2014/0281728 A1 | 9/2014 | Homma |
| 2015/0149565 A1* | 5/2015 | Ahmed .................. H04L 65/403 709/206 |
| 2015/0154484 A1 | 6/2015 | Iwasaki et al. |
| 2015/0181080 A1 | 6/2015 | Nuggehalli |
| 2015/0282233 A1 | 10/2015 | Homma et al. |
| 2016/0050314 A1 | 2/2016 | Homma et al. |
| 2016/0205345 A1 | 7/2016 | Homma et al. |
| 2016/0330202 A1 | 11/2016 | Homma et al. |

FOREIGN PATENT DOCUMENTS

| | | |
|---|---|---|
| JP | 2014-171221 | 9/2014 |
| JP | 2015-8381 | 1/2015 |
| WO | WO 2016/028279 A1 | 2/2016 |

OTHER PUBLICATIONS

U.S. Appl. No. 15/213,707, filed Jul. 19, 2016.
U.S. Appl. No. 15/218,427, filed Jul. 25, 2016.
U.S. Appl. No. 15/269,380, filed Sep. 19, 2016.
Extended European Search Report dated Aug. 2, 2017 in Patent Application No. 17153063.7.
Office Action dated May 15, 2019 in European Application No. 17 153 063.7-1214.
Office Action dated Nov. 19, 2019 in Japanese Application No. 2016-048246.

* cited by examiner

US 10,554,732 B2

REMOTE COMMUNICATION SYSTEM, COMMUNICATION TERMINAL, AND EXTENDED FUNCTION PROVIDING METHOD

CROSS-REFERENCE TO RELATED APPLICATIONS

The present application claims the benefit of priority under 35 U.S.C. § 119 of Japanese Patent Application No. 2016-048246 filed on Mar. 11, 2016, the entire contents of which are incorporated herein by reference.

BACKGROUND OF THE INVENTION

1. Field of the Invention

The disclosures herein generally relate to a remote communication system, a communication terminal, and an extended function providing method.

2. Description of the Related Art

Remote communication such as videoconferencing is widely utilized in accordance with the advanced network environments.

Various information processing devices are used as client terminals in remote communication systems, as the information processing technologies make great progress. Not only terminals dedicated for videoconferencing, Personal Computers (PCs), smartphones, tablet terminals, etc., but also electronic whiteboards are used as client terminals (see Japanese Unexamined Patent Application Publication No. 2014-171221).

SUMMARY OF THE INVENTION

In one embodiment, a remote communication system includes: a first communication terminal configured to establish a call session for transmitting and receiving at least a voice with a target communication terminal, and to communicate with the target communication terminal; and a second communication terminal configured to participate in the call session. The second communication terminal provides a given function that is not limited to a telephone call to one of the first communication terminal and the target communication terminal, in response to a request from one of a user of the second communication terminal, the first communication terminal, and the target communication terminal.

DESCRIPTION OF THE PREFERRED EMBODIMENTS

In a previously described remote communication system, participation of different types of client terminals in remote communication is supported. However, functions of client terminals for inputting and outputting audio and video are merely utilized.

It is a general object of at least one embodiment of the present invention to provide a remote communication system, a communication terminal, and an extended function providing method that substantially obviates one or more problems caused by the limitations and disadvantages of the related art.

In the following, embodiments of the present invention will be described with reference to the accompanying drawings.

<Configuration>

Figure 1:
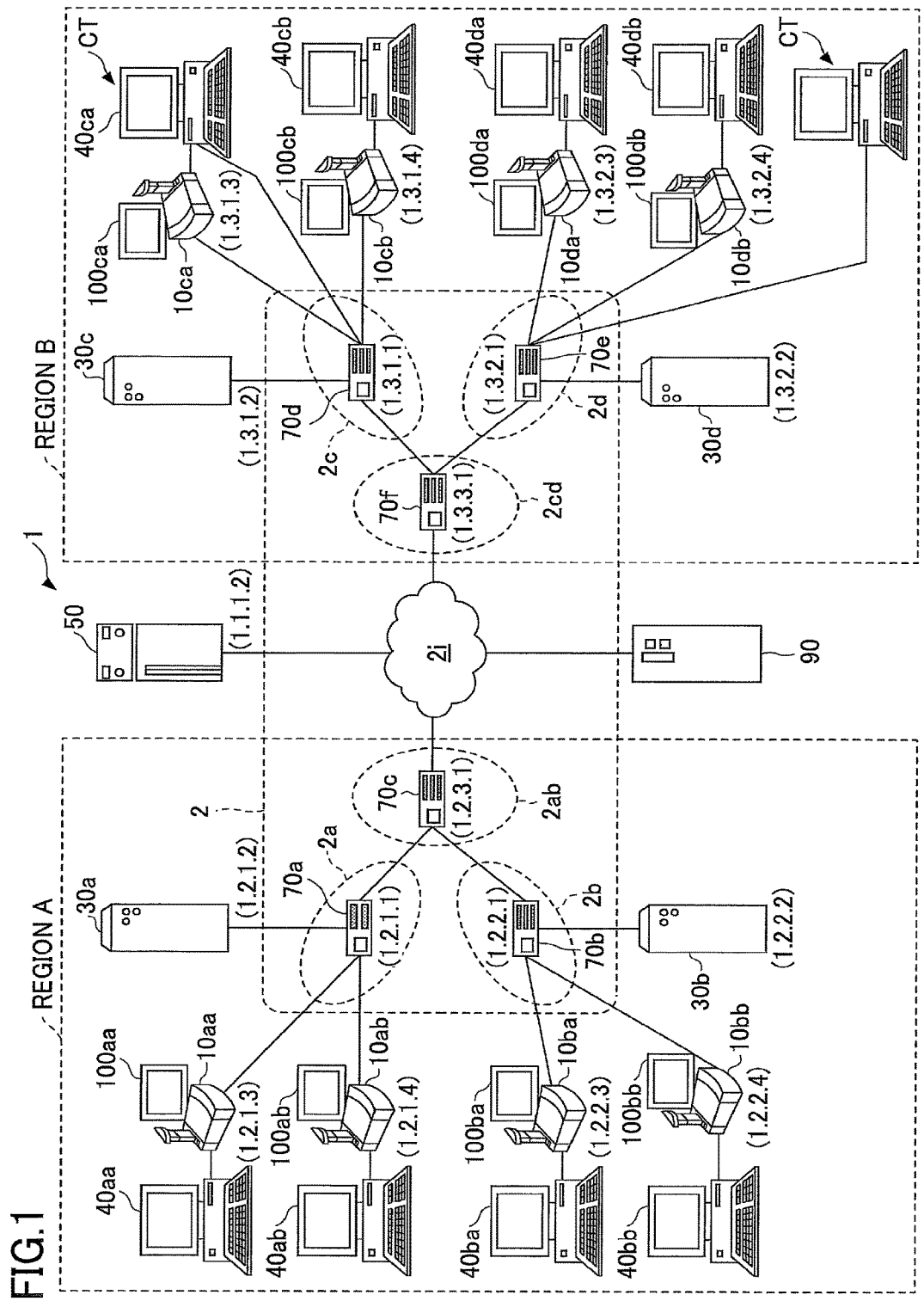
FIG. 1 is an example of a system configuration view of a remote communication system.

FIG. 1 is an example of a system configuration view of a remote communication system. Firstly, the system outline will be described. A remote communication system 1 includes remote communication terminals 10 (10aa, . . . 10ca, . . . ), relays (30a, . . . , 30c, . . . ), and a remote communication management system 50. The remote communication terminals 10 are client terminals that establish remote communication. The remote communication terminals 10 transmit and receive audio and moving images through the relay 30 in the remote communication. Such client terminals include a client terminal dedicated for remote communication that is coupled to the remote communication management system 50 through terminal authentication, and a general-purpose communication terminal, such as a PC and a smartphone, that has been authenticated through user authentication. Users who have logged in through the user authentication by using general-purpose communication terminals are allowed to utilize the remote communication in the same manner as the client terminal. Terminal IDs (e.g., accounts) are also managed and used in the same manner.

Separately from the client terminals, there are external input devices 40 (40aa, . . . , 40ca, . . . ) that provide the client terminals with document screen data. The external input devices 40 are capable of sharing information with the other client terminals. For example, screen data created by a document application that runs on the external input device 40 is provided to the remote communication terminal 10 that is coupled, so that the document screen can be displayed on a terminal with which the remote communication terminal 10 is in communication. In addition to the above terminals, communication terminals CT that perform only the call control and address book management and that do not provide data for the remote communication may be coupled in the remote communication system. The communication terminals CT participate in the remote communication through networks in a similar manner to the client terminals. The communication terminal CT may also serve as the external input device 40. In FIG. 1, the external input device 40*ca* also serves as a communication terminal CT.

The remote communication management system 50 provides interfaces necessary for providing the terminals with destination lists, transmitting destination list registration requests and receiving approvals or denials from the terminals, and holding and updating destination list registration request approval and denial information in services performed in the remote communication system and registration request approval and denial information between the services managed by administrators.

In more detail, the remote communication system is divided into a region A and a region B, as an example. The remote communication terminals 10 are located in the two regions. However, the remote communication is realized with at least two remote communication terminals.

The remoter communication system 1 includes a plurality of remote communication terminals 10*aa*, 10*ab*, . . . , and 10*db*, displays 100*aa*, 100*ab*, . . . , and 100*db*, a plurality of relays 30*a*, 30*b*, 30*c*, and 30*d*, a remote communication management system 50, a program providing system 90, and external input devices 40. The displays 100*aa*, 100*ab*, . . . , and 100*db* are respectively provided for the plurality of remote communication terminals 10*aa*, 10*ab*, . . . , and 10*db*. In the present embodiment, any one of the remote communication terminals 10*aa*, 10*ab*, . . . , and 10*db* is referred to as "remote communication terminal 10". Any one of the displays 100*aa*, 11*ab*, . . . , and 100*db* is referred to as "display 100". Any one of the relays 30*a*, 30*b*, 30*c*, and 30*d* is referred to as "relay 30". Any one of the external input devices 40 is referred to as "external input device 40".

The remote communication terminal 10 transmits and receives data such as audio data and image data to and from another remote communication terminal 10. In the present embodiment, a case where the image data is a video image will be described. However, not only a video image but also a still image is applicable. In addition, the image data may include both a moving image and a static image. The relay 30 relays audio data and image data between the plurality of remote communication terminals 10. The remote communication management system 50 manages the remote communication terminals 10 and the relays 30 in an integrated fashion.

The external input device 40 is coupled to the remote communication terminal 10. The external input device 40 transmits display data for displaying document data to the remote communication terminal 10. Herein, the document data means, for example, data used in software such as word processing software, spreadsheet software, and presentation software.

A plurality of routers (70*a*, 70*b*, . . . , and 70*f*) illustrated in FIG. 1 select optimal paths for audio data and image data. In one embodiment, any one of the routers (70*a*, 70*b*, . . . , and 70*f*) is referred to as "router 70".

The program providing system 90 includes a Hard Disk Drive (HDD) in which is stored a remote communication terminal program for enabling the remote communication terminal 10 to perform various functions or various means. The program providing system 90 is capable of transmitting the remote communication terminal program to the remote communication terminal 10. The HDD of the program providing system 90 also stores a relay program for enabling the relay 30 to perform various functions or various means. The program providing system 90 is capable of transmitting the relay program to the remote communication terminal 10. The HDD of the program providing system 90 also stores a remote communication management program for enabling the remote communication management system 50 to perform various functions or various means. The program providing system 90 is capable of transmitting the remote communication management program to the remote communication management system 50.

The remote communication terminal 10*aa*, the remote communication terminal 10*ab*, the relay 30*a*, and the router 70*a* are coupled to each other through a Local Area Network (LAN) 2*a*, and are capable of communicating with each other. The remote communication terminal 10*ba*, the remote communication terminal 10*bb*, the relay 30*b*, and the router 70*b* are coupled to each other through a LAN 2*b*, and are capable of communicating with each other. The LAN 2*a* and the LAN 2*b* are coupled to each other through a dedicated line 2*ab* to be capable of communicating with each other. The dedicated line 2*ab* includes the router 70*c*. The LAN 2*a* and the LAN 2*b* are implemented in the region A. For example, the region A is located in Japan. The LAN 2*a* is implemented in an office in Tokyo. The LAN 2*b* is implemented in an office in Osaka.

On the other hand, the remote communication terminal 10*ca*, the remote communication terminal 10*cb*, the relay 30*c*, and the router 70*d* are coupled to each other through a LAN 2*c*, and are capable of communicating with each other. The remote communication terminal 10*da*, the remote communication terminal 10*db*, the relay 30*d*, and the router 70*e* are coupled to each other through a LAN 2*d*, and are capable of communicating with each other. The LAN 2*c* and the LAN 2*d* are coupled to each other through a dedicated line 2*cd* to be capable of communicating with each other. The dedicated line 2*cd* includes the router 70*f*. The LAN 2*c* and the LAN 2*d* are implemented in the region B. For example, the region B is located in the United Sates. The LAN 2*c* is implemented in an office in New York City. The LAN 2*d* is implemented in an office in Washington D.C. The region A and the region B are respectively coupled to each other between the router 70*c* and the router 70*f* through the Internet 2*i*, and are capable of communicating with each other.

The remote communication management system 50 and the program providing system 90 are coupled through the Internet 2*i* to the remote communication terminals 10 and the relays 30. The remote communication management system 50 and the program providing system 90 may be arranged in one of the region A and the region B. The remote communication management system 50 and the program providing system 90 may be arranged in any other region. In the present embodiment, a communication network 2 is implemented by including the LAN 2*a*, the LAN 2*b*, the dedicated line 2*ab*, the Internet 2*i*, the dedicated line 2*cd*, the LAN 2*c*, and the LAN 2*d*.

In FIG. 1, four numbers are respectively given below the remote communication terminals 10, the relays 30, the remote communication management system 50, the routers 70, and the program providing system 90. Such four numbers simply represent IP addresses of the commonly used IPv4. For example, "1.2.1.3" is the IP address of the remote communication terminal 10*aa*. Instead of IPv4, IPv6 may be used, but IPv4 is used herein for simplifying the description.

<Hardware Configuration>

Next, the hardware configuration of each device will be described. In the present embodiment, a case where a delay occurs in receiving image data by a remote communication terminal 10 serving as a relay destination will be described. In this case, the relay 30 changes the resolution of the image in the image data, and then transmits the image data to the remote communication terminal 10 serving as the relay destination.

Figure 2:
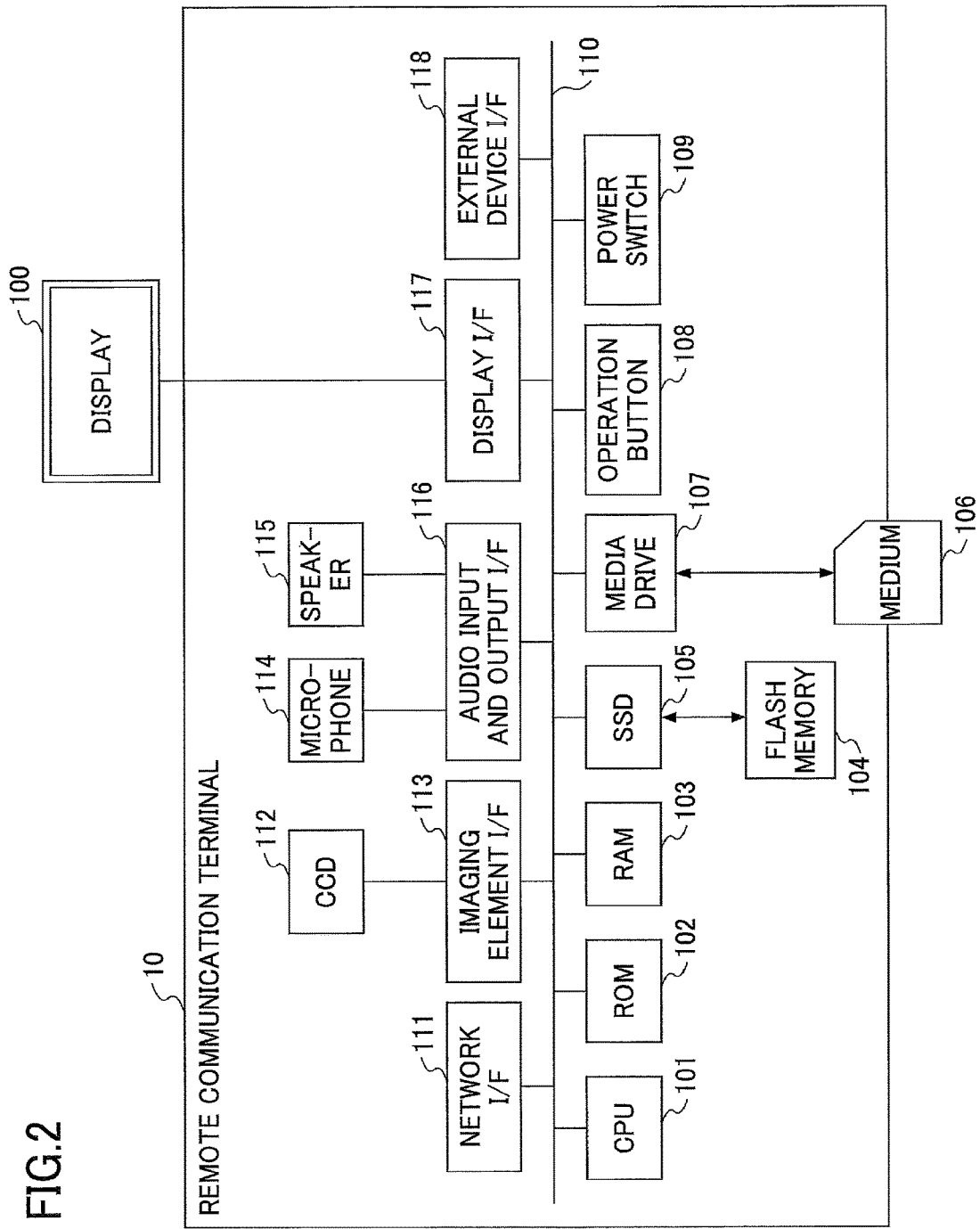
FIG. 2 is an example of a hardware configuration view of a remote communication terminal.

FIG. 2 is an example of a hardware configuration view of the remote communication terminal 10. As illustrated in FIG. 2, the remote communication terminal 10 in the present embodiment includes a Central Processing Unit (CPU) 101 that controls the overall operation of the remote communication terminal 10, a Read Only Memory (ROM) 102 that stores a remote communication terminal program, a Random Access Memory (RAM) 103 used as a work area of the CPU 101, a flash memory 104 that stores various data including audio data and image data, a Solid State Drive (SSD) 105 that controls reading data from the flash memory 104 and writing data into the flash memory 104 in response to the control from the CPU 101, a media drive 107 that controls reading data from a recording medium 106 such as a flash memory and writing (storing) data into the recording medium 106, an operation button 108 that is operated when a destination of the remote communication terminal 10 is selected, a power-supply switch 109 that switches between ON and OFF of the power of the remote communication terminal 10, a network interface (I/F) 111 that transmits data through the communication network 2, a Charge Coupled Device (CCD) 112 that captures an image of a subject in response to the control from the CPU 101 to acquire image data, an imaging element I/F 113 that controls driving of the CCD 112, a microphone 114 to which sounds are input, a speaker 115 from which sounds are output, an audio input and output I/F 116 that processes input and output of audio signals between the microphone 114 and the speaker 115 in response to the control from the CPU 101, a display I/F 117 that transmits the image data to an externally attached display 100 in response to the control from the CPU 101, an external device I/F 118 that transmits and receives various data to and from an external device, and a bus line 110 such as an address bus or a data bus, so as to electrically couple the above-described component elements, as illustrated in FIG. 2.

The recording medium 106 is detachable from the remote communication terminal 10. The recording medium 106 is not limited to the flash memory 104. Any non-volatile memory that reads and writes data in response to the control from the CPU 101 is applicable to the recording medium 106. For example, Electrically Erasable and Programmable ROM (EEPROM) may be used. The CCD 112 may be a solid-state image sensing element, which converts light into electrical charge to digitize the image (e.g., video image) of a subject. Not only CCD but also any imaging element that captures images of a subject, such as Complementary Metal Oxide Semiconductor (CMOS) may be applicable to the CCD 112. The display 100 includes a liquid crystal or an organic electroluminescence (EL) that displays images of a subject or icons for operation.

The remote communication terminal program may be recorded in a computer-readable recording medium such as the recording medium 106 in an installable or executable file format, and then may be distributed.

Figure 3:
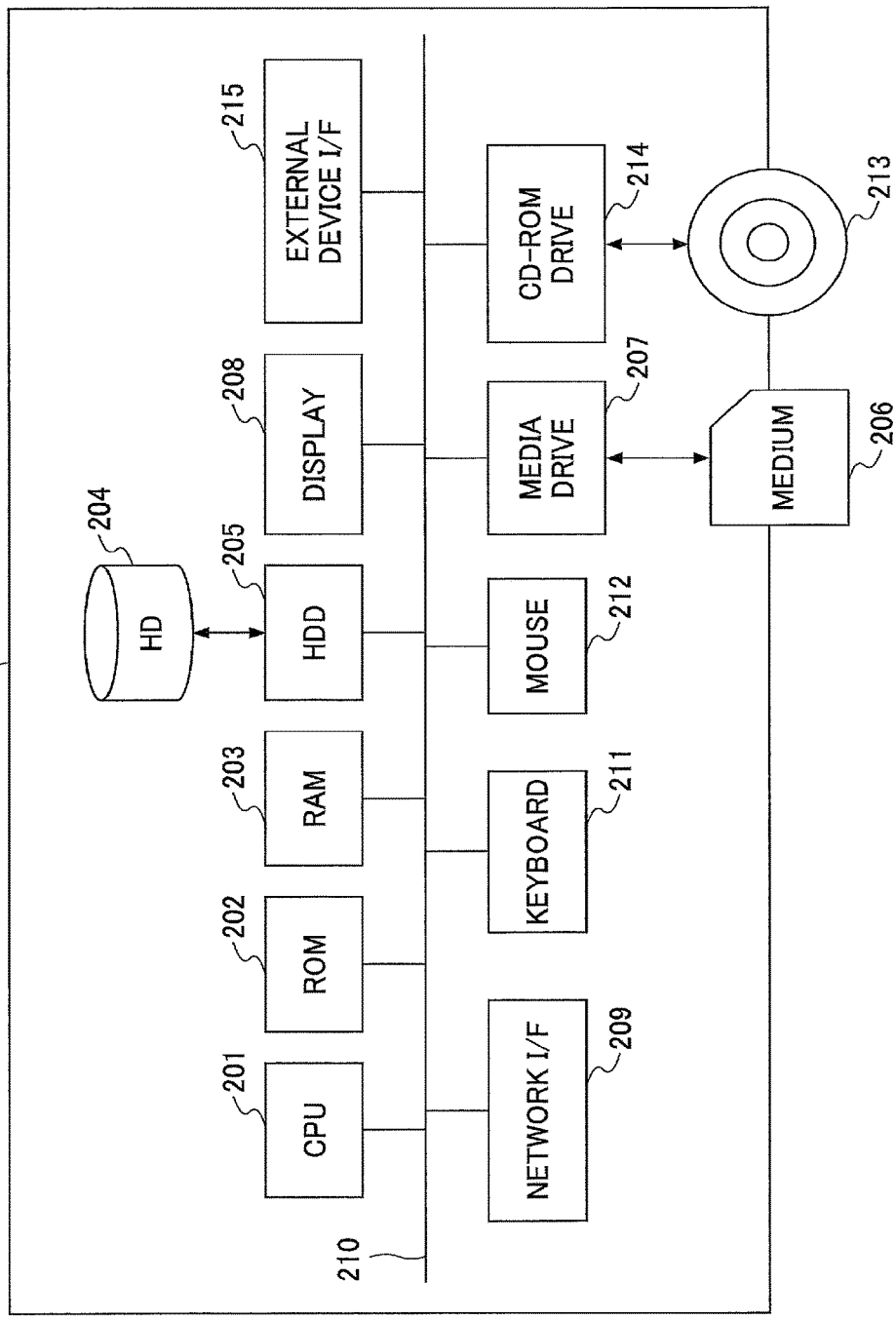
FIG. 3 is an example of a hardware configuration view of a remote communication management system.

FIG. 3 is an example of a hardware configuration view of the remote communication management system in one embodiment of the present invention. The remote communication management system 50 includes a CPU 201 that controls the overall operation of the remote communication management system 50, a ROM 202 that stores a remote communication management program, a RAM 203 used as a work area of the CPU 201, a Hard Disk (HD) 204 that stores various data, a Hard Disk Drive (HDD) 205 that controls reading various data from the HD 204 and writing various data into the HD 204 in response to the control from the CPU 201, a media drive 207 that controls reading data from the recording medium 206 such as a flash memory and writing (storing) data into the recording medium 206, a display 208 that displays various types of information such as a cursor, a menu, a window, a character, an image, etc., a network I/F 209 that transmits data through the communication network 2, a keyboard 211 including a plurality of keys for inputting characters, numerical numbers, various instructions, etc., a mouse 212 used for selection and execution of various instructions, selection of a process target, moving the cursor, etc., a CD-ROM drive 214 that controls reading data from a Compact Disc Read Only Memory (CD-ROM) 213 and writing data into the CD-ROM 213, which serves as an example of a detachable memory medium, an external device I/F 215 that transmits and receives information to and from an external device, and a bus line 210 such as an address bus and a data bus for electrically coupling the above-described component elements, as illustrated in FIG. 3.

The remote communication management program may be recorded in a computer-readable recording medium such as the recording medium 206 or the CD-ROM 213 in an installable or executable file format, and then may be distributed.

The external input device 40 and the communication terminal CT have similar hardware configurations to the hardware configuration of the remote communication management system 50, and the detailed description is omitted. In the ROM 202, however, an external input device program for controlling the external input device 40 is stored. Also in this case, the external input device program may be recorded in a computer-readable recording medium such as the recording medium 206 or the CD-ROM 213 in an installable or executable file format, and such a computer-readable recording medium may be distributed.

The relay 30 has a similar hardware configuration to the hardware configuration of the remote communication management system 50, and the detailed description is omitted. In the ROM 202, a relay program for controlling the relay 30 is stored. Also in this case, the relay program may be recorded in a computer-readable recording medium such as the recording medium 206 or the CD-ROM 213 in an installable or executable file format, and then may be distributed.

The program providing system 90 has a similar hardware configuration to the hardware configuration of the remote communication management system 50, and the detailed description is omitted. In the ROM 202, however, a program providing program for controlling the program providing system 90 is stored. Also in this case, the program providing program may be recorded in a computer-readable recording medium such as the recording medium 206 or the CD-ROM 213 in an installable or executable file format, and then may be distributed.

Other examples of the detachable memory medium may include a Compact Disc Recordable (CD-R), a Digital Versatile Disk (DVD), and a Blu-ray Disc (Registered Trademark). The above-described programs may be stored in such a computer-readable memory medium, and then may be distributed.

Figure 4:
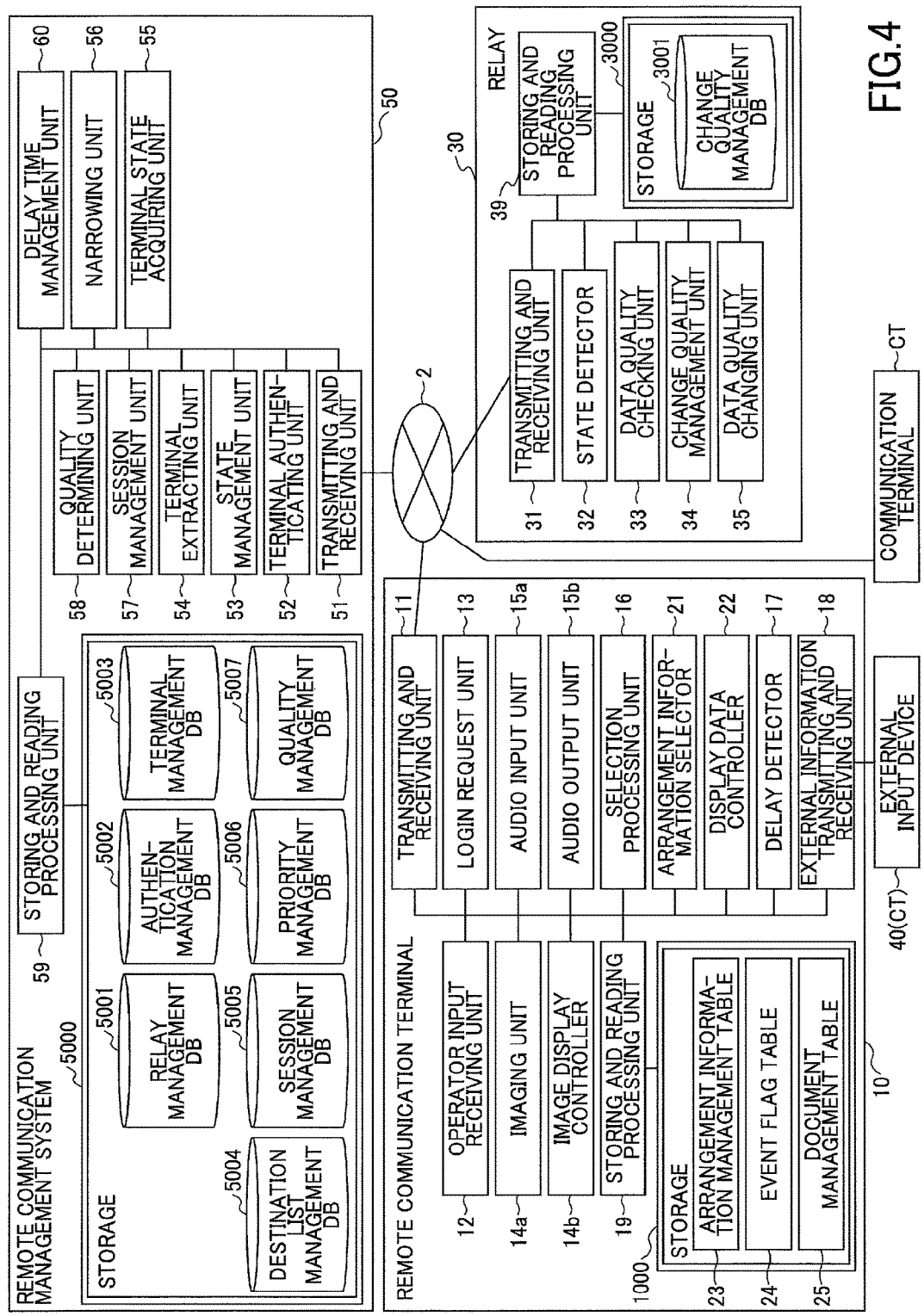
FIG. 4 is an example of a functional block diagram of terminals, devices, and systems included in the remote communication system.
Figure 5:
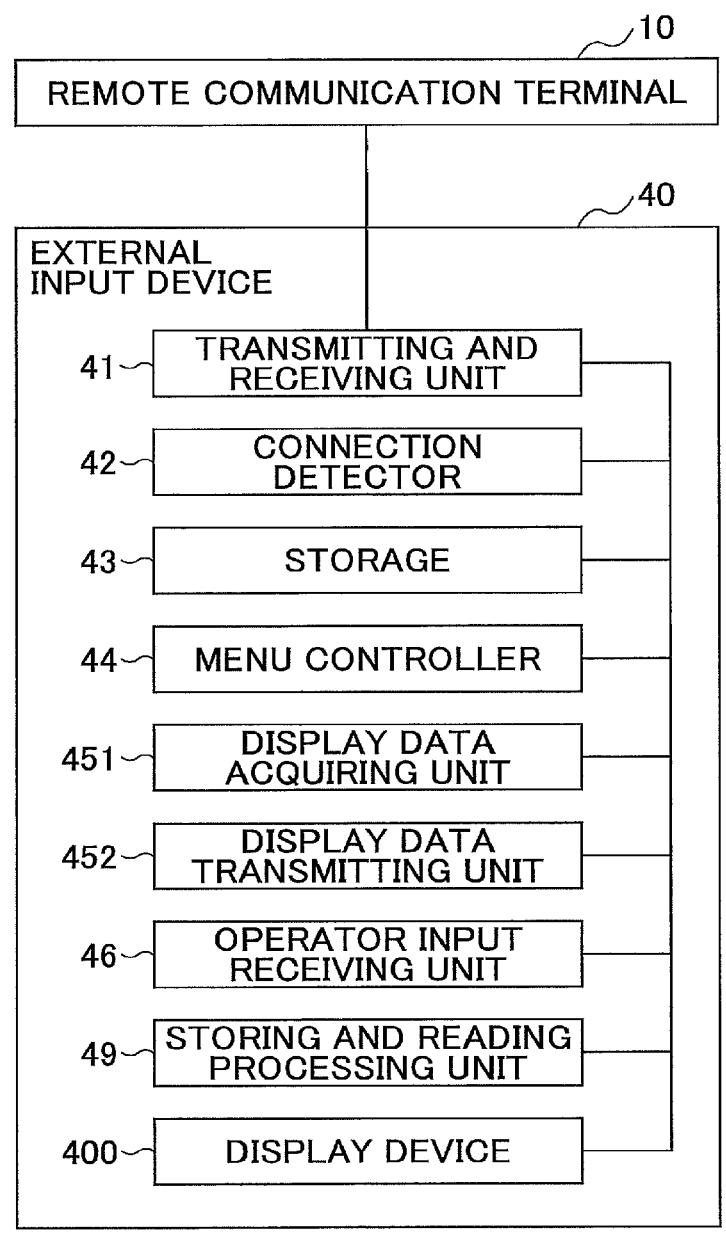
FIG. 5 is an example of a functional block diagram of an external input device.

FIG. 4 is an example of a functional block diagram of terminals, devices, and systems included in the remote communication system 1 in the present embodiment. In FIG. 4, the remote communication terminal 10, the relay 30, the remote communication management system 50, and the communication terminal CT are capable of communicating data through the communication network 2. The external input device 40 is coupled to the remote communication terminal 10 through a Universal Serial Bus (USB) cable, for example, to be capable of communicating data with the remote communication terminal 10. The program providing system 90 illustrated in FIG. 1 is not directly involved in the videoconferencing communication, and the program providing system 90 is not illustrated in FIG. 4, accordingly. In addition, FIG. 5 is an example of a functional block diagram of the external input device 40.

<Functional Configuration of Remote Communication Terminal>

The remote communication terminal 10 includes a transmitting and receiving unit 11, an operator input receiving unit 12, a login request unit 13, an imaging unit 14a, an image display controller 14b, an audio input unit 15a, an audio output unit 15b, a selection processing unit 16, a delay detector 17, an external information transmitting and receiving unit 18, a storing and reading processing unit 19, an arrangement information selector 21, and a display data controller 22. The above units are functions or means, each of which is enabled by an operation performed by any one of the component elements illustrated in FIG. 2 in response to an instruction from the CPU 201 in accordance with a program stored in the ROM 202.

In a case where the external input device 40 is coupled to the remote communication terminal 10, the external input device 40 acquires the display data, and transmits the acquired display data to the remote communication terminal 10. On receiving the display data, the remote communication terminal 10 transmits the received display data through the communication network 2 to the relay 30.

The remote communication terminal 10 includes a storage 1000. The storage 1000 is configured with any one of the ROM 102, the RAM 103, and the flash memory 104, which are illustrated in FIG. 2. In the storage 1000, an arrangement information management table 23 and an event flag table 24 are stored.

The transmitting and receiving unit 11 of the remote communication terminal 10 is enabled by the network I/F 111 illustrated in FIG. 2, and transmits and receives various data (i.e., information) through the communication network 2 to and from another terminal, another device, or another system. The operator input receiving unit 12 is enabled by the operation button 108 and a power supply switch 109 illustrated in FIG. 2, and receives various inputs made by a user. For example, when the user switches on the power supply switch 109 illustrated in FIG. 2, the operator input receiving unit 12 illustrated in FIG. 4 receives a power-on instruction, and then powers on the remote communication terminal 10. The login request unit 13 is enabled by an instruction from the CPU 101 illustrated in FIG. 2. On receiving the power-on instruction, the login request unit 13 automatically transmits login request information indicating a login request and a current IP address of the remote communication terminal 10ab from the transmitting and receiving unit 11 through the communication network 2 to the remote communication management system 50.

The imaging unit 14a is enabled by the CCD 112 and the imaging element I/F 113 illustrated in FIG. 2. The imaging unit 14a captures an image of a subject and outputs image data that has been obtained by capturing the image. The image display controller 14b is enabled by the display I/F 117 illustrated in FIG. 2. The image display controller 14b controls transmission of the image data to the externally attached display 100. The image display controller 14b displays the image data that has been captured by the imaging unit 14a of the remote communication terminal 10, and also displays image data that has been captured by the imaging unit 14a of another remote communication terminal 10. In addition, the image display controller 14b displays image data that has been displayed and then captured on a display device 400 of the external input device 40 coupled to the remote communication terminal 10. The image display controller 14b has a function of controlling a displayed area in which image data or display data is displayed.

The audio input unit 15a is enabled by the microphone 114 and the audio input and output I/F 116 illustrated in FIG. 2. The audio input unit 15a receives inputs of user's voices, converts the voices into audio signals, and then outputs audio data of the audio signals. The audio output unit 15b is enabled by the speaker 115 and the audio input and output I/F 116. The audio output unit 15b converts the audio signals of the audio data into voices, and then outputs the converted voices. The audio input unit 15a measures an input level of the audio signal, compares the measured input level with a threshold value, and determines presence or absence of an audio signal.

The arrangement information selector 21 selects a shared flag from the event flag table 24 in accordance with a delivered event of the display data, and sets the shared flag on the arrangement information management table 23, so as to give an instruction including display arrangement information on a screen to be displayed on the display 100, to the image display controller 14b.

The selection processing unit 16 performs a final selecting process of selecting one of the plurality of relays 30. The selection processing unit 16 counts the received time and date when the transmitting and receiving unit 11 receives preliminary transmission information, whenever the transmitting and receiving unit 11 receives the preliminary transmission information. For every piece of the preliminary transmission information whose received time and date has been counted, the selection processing unit 16 calculates a time needed from transmission to reception of the preliminary transmission information in accordance with a difference between the received time and date that has been counted and the transmitted time and date included in the preliminary transmission information. The selection processing unit 16 selects one of the plurality of relays 30 that have relayed the preliminary transmission information, whichever has the shortest time of all the calculated times. The selection processing unit 16 finally selects one relay 30, accordingly.

The delay detector 17 is enabled by an instruction from the CPU 101 illustrated in FIG. 2. The delay detector 17 detects a delay time (millisecond) of the audio data or the image data that is transmitted through the relay 30 from another remote communication terminal 10. The external information transmitting and receiving unit 18 transmits and receives data to and from the external input device 40 through the external device I/F 215. The storing and reading processing unit 19 performs a process of storing various data in the storage 1000 and a process of reading various data from the storage 1000. The SSD 105 illustrated in FIG. 2 is a substantialized configuration of the storage 1000. The storage 1000 stores terminal identifications (IDs) for identifying the remote communication terminals 10, passwords, relay IDs for identifying the relays 30 that relay audio data, image data, and various data, and IP addresses of destination terminals, for example.

The display data controller 22 acquires display data that is displayed on the external input device 40. The display data controller 22 transmits the acquired display data to the remote communication terminal 10. The display data represents image data in which an image displayed on the screen of the display device 400 is converted into a Joint Photographic Experts Group (JPEG) format or a Bitmap format, or draw commands in a Graphics Device Interface (GDI) format. The display data may include document data, or may be merely a desktop screen without including the document data.

The display data controller 22 gives a display data delivery start request or a display data delivery stop request to the relay 30, in response to a request from the external input device 40. The display data controller 22 refers to the event flag table 24 in response to a delivery event from the relay 30, determines a state of a display control flag, and transmits the display control flag state to the external input device 40.

The terminal ID and the relay ID in the present embodiment indicate identification information including words, characters, signs, marks, etc., which are respectively used for uniquely identifying the remote communication terminal 10 and the relay 30. The terminal ID and the relay ID may be identification information in which at least two of the words, characters, signs, and marks are combined.

<Functional Configuration of External Input Device>

As illustrated in FIG. 5, the external input device 40 includes a transmitting and receiving unit 41, a connection detector 42, a storage 43, a display data acquiring unit 451, a display data transmitting unit 452, a menu controller 44, an operator input receiving unit 46, and a storing and reading processing unit 49. The above units are functions or means, each of which is enabled by an operation performed by any one of the component elements illustrated in FIG. 3 in response to an instruction from the CPU 201 in accordance with a program stored in the ROM 202. The external input device 40 includes the display device 400 configured with the display 208 illustrated in FIG. 3. The external input device 40 is equipped with Operating System (OS) such as Windows OS (Registered Trademark), and thus has a function of running a program when the external input device 40 is coupled to another device, accordingly.

The transmitting and receiving unit 41 of the external input device 40 is enabled by the network I/F 209 illustrated in FIG. 3. The transmitting and receiving unit 41 transmits and receives various data (i.e., information) to and from the remote communication terminal 10. The connection detector 42 detects that data transmission and reception to and from the remote communication terminal 10 is enabled by the external device I/F 215. The operator input receiving unit 46 is enabled by a keyboard or a mouse. The operator input receiving unit 46 receives operator inputs from an operator of the device.

The display data acquiring unit 451 captures the screen of the display device 400 to acquire the display data that is displayed on the external input device 40. The display data transmitting unit 452 transmits the display data that has been acquired by the display data acquiring unit 451 to the remote communication terminal 10.

The storing and reading processing unit 49 performs a process of storing various data in the storage 43 and a process of reading various data from the storage 43. The HDD 205 illustrated in FIG. 3 is a substantialized configuration of the storing and reading processing unit 49. The HD 204 is a substantialized configuration of the storage 43. A document management table 432 and a transition condition table 431 are stored in the storage 43. The display device 400 is enabled by the display 208. The display device 400 displays data on the screen. The menu controller 44 displays on the display device 400 a content of menu and a shared state in accordance with a display control flag.

<Functional Configuration of Communication Terminal>

Figure 6:
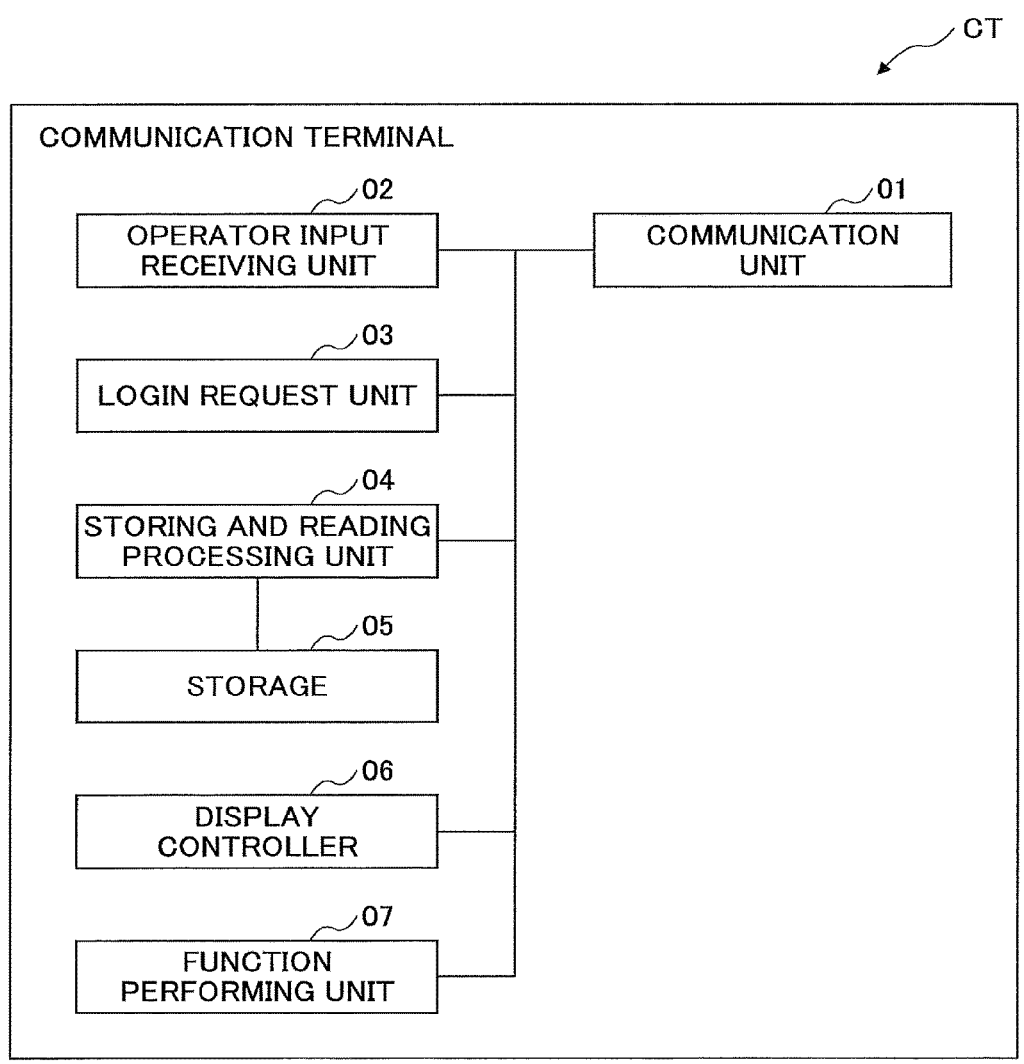
FIG. 6 is an example of a functional block diagram of a communication terminal.

As illustrated in FIG. 6, the communication terminal CT includes a communication unit 01, an operator input receiving unit 02, a login request unit 03, a storing and reading processing unit 04, a storage 05, a display controller 06, and a function performing unit 07. The communication unit 01 communicates with another device through networks. The operator input receiving unit 02 receives inputs from the user of the device. The login request unit 03 makes a login request to the remote communication management system 50 in response to the operation made by the user or in accordance with the settings. The storing and reading processing unit 04 refers to the storage 05 and updates the data. The display controller 06 controls the screen display on the communication terminal CT. The function performing unit 07 performs a given function spontaneously or in response to a request from another device. Such a given function is not limited to communication of audio and image in the remote communication, although details will be described later. In a case where the communication terminal CT also serves as the external input device 40, the communication terminal CT also includes the functions illustrated in FIG. 5.

<Operation>
<Start-Up of Terminal>

In remote communication, as described above, not only the remote communication terminal 10 but also a general-purpose terminal in which a dedicated application is installed can be used for client terminals. In the following description, both the remote communication terminal 10 and the general-purpose terminal are simply referred to as "terminal".

Figure 7:
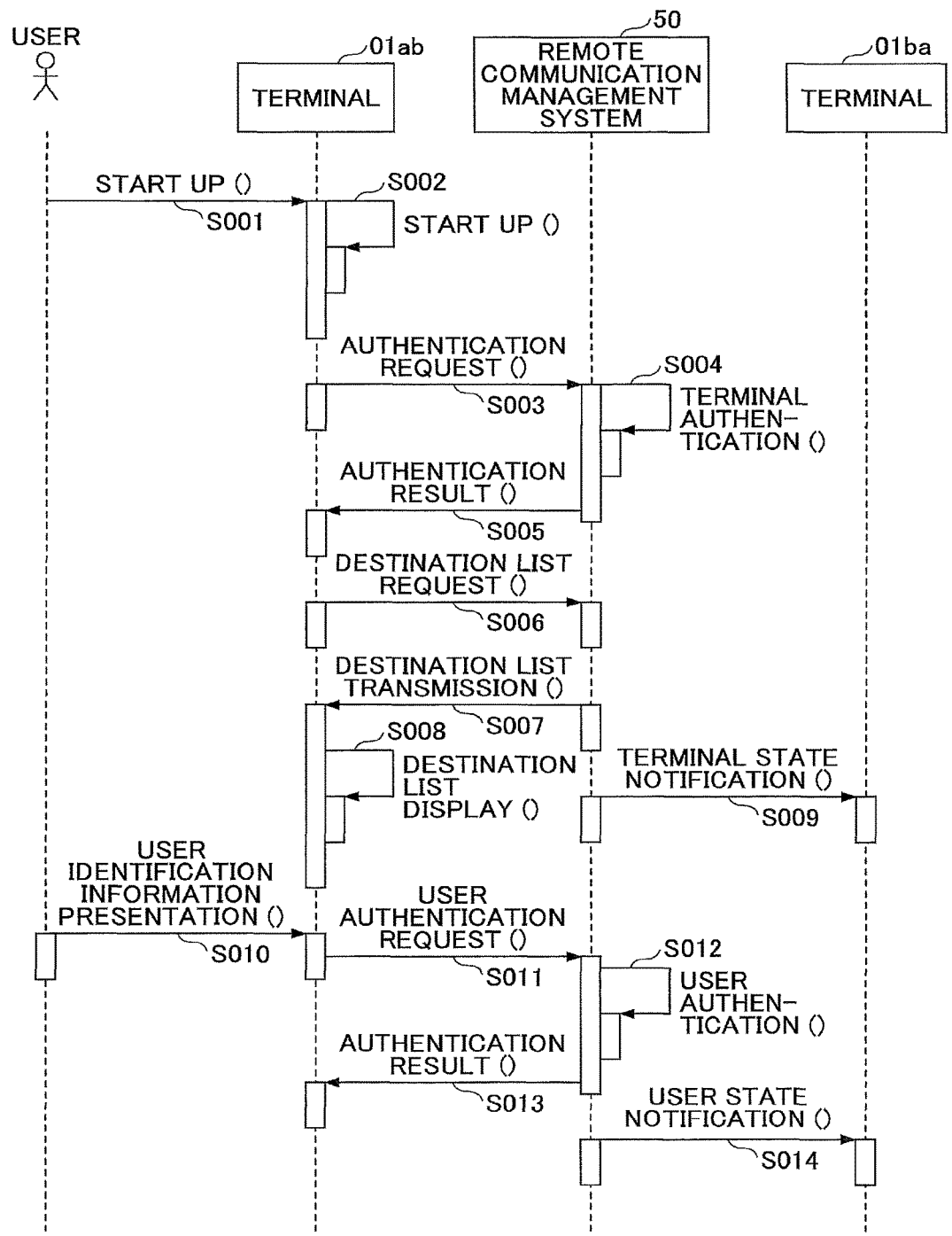
FIG. 7 is a sequence chart of a process example when a terminal starts up.

FIG. 7 is a sequence chart of a process example when a terminal starts up. In FIG. 7, a user switches on the power button of a terminal 01*ab* to start up the terminal 01*ab* (step S001). Then, the terminal 01*ab* performs a start-up process (step S002).

Subsequently, the terminal 01*ab* makes an authentication request to the remote communication management system 50 in accordance with a predetermined shared account (step S003). The remote communication management system 50 performs terminal authentication (step S004), and makes a response of an authentication result to the terminal 01*ab* (step S005).

When the authentication is normally performed, the terminal 01*ab* makes a destination list request to the remote communication management system 50 (step S006). Then, the remote communication management system 50 transmits the destination list (step S007). The terminal 01*ab* displays the destination list on the screen, accordingly (step S008). The remote communication management system 50 informs another terminal 01*ba* of a state of the terminal 01*ab* (step S009).

After that, when the user makes a login operation by presenting user identification information of a personal account to the terminal 01*ab* (step S010), the terminal 01*ab* makes a user authentication request to the remote communication management system 50 (step S011). It is to be noted that depending on the system implementation, in addition to the login operation by presenting the user identification information, access may be allowed by presenting valid user identification information without a login procedure.

On receiving the request, the remote communication management system 50 performs user authentication (step S012), and makes a response of an authentication result to the terminal 01*ab* (step S013). In addition, the remote communication management system 50 informs another terminal 01ba of the state of the user (step S014).

On the other hand, for a client terminal that is a general-purpose terminal, the process in step S001 to step S009 is omitted. However, the process in step S10 to S14 is performed.

<Participation of Communication Terminal and Utilization of Extended Function by Client Terminal>

Figure 8:
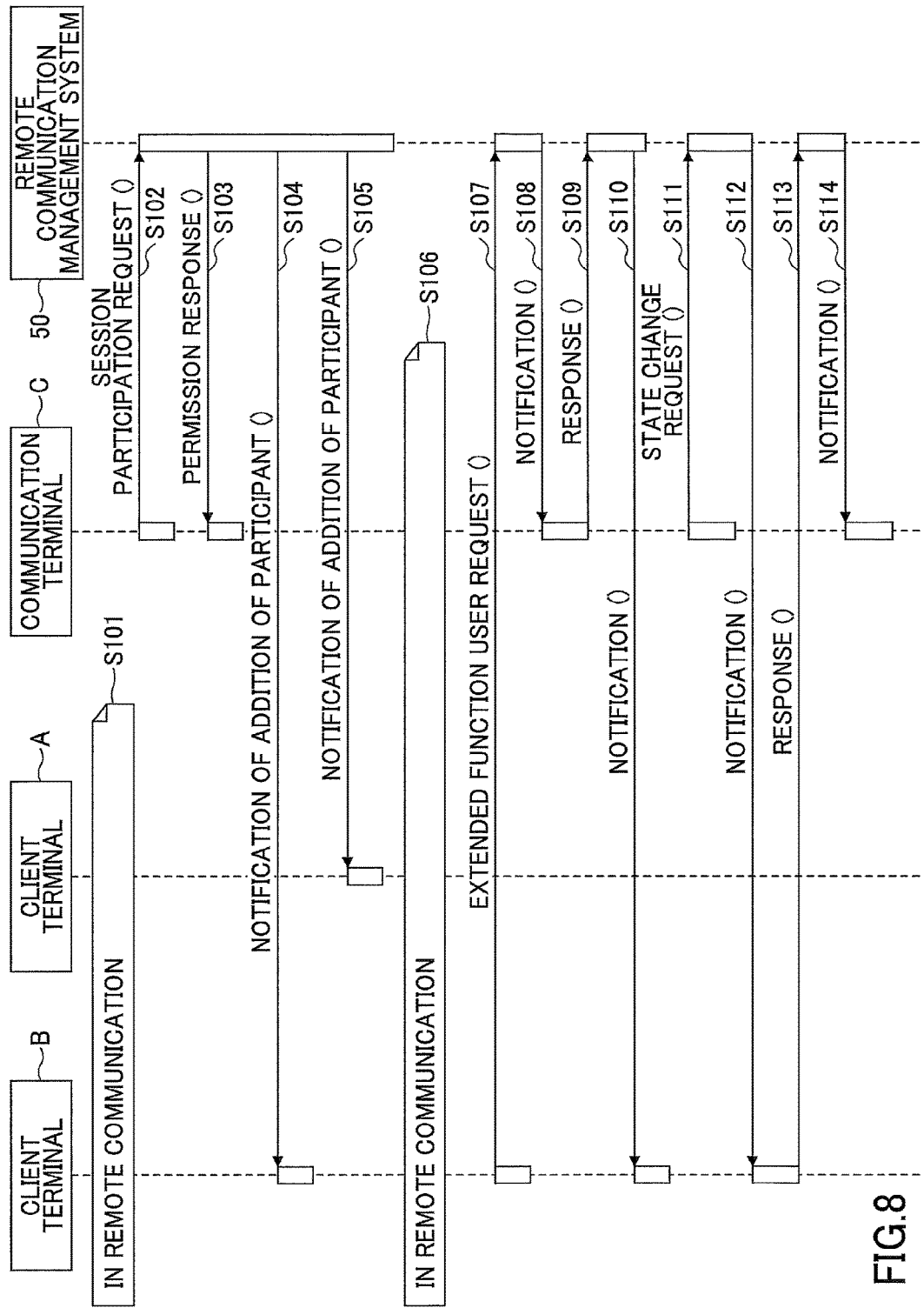
FIG. 8 is a sequence chart of a process example illustrating participation of a communication terminal and utilization of an extended function by a client terminal.

FIG. 8 is a sequence chart of a process example illustrating participation of a communication terminal and utilization of an extended function by a client terminal. Client terminals A and B are used for establishing remote communication. The client terminals A and B may be dedicated terminals, or may be general-purpose terminals. A communication terminal C is a communication terminal CT that also serves as the external input device 40, or a communication terminal CT is directly coupled to a network.

In FIG. 8, it is assumed that the client terminals A and B have established remote communication and are remotely communicating with each other (step S101). In this state, the communication terminal C makes a session participation request to the remote communication management system 50 in order to participate in the remote communication between the client terminals A and B (step S102). Note that when the communication terminal C and the terminal (e.g., client terminal A) are used by an identical user, the communication terminal C and the client terminal A can be associated with each other beforehand. When the communication terminal C detects that the associated client terminal A has established a session, the communication terminal C may be configured to automatically make a session participation request, or may be configured to make a session participation request in response to an operation of the user.

When the communication terminal C makes the session participation request, the remote communication management system 50 performs a process of adding the communication terminal C to the intended session. The remote communication management system 50 makes a participation permission response to the communication terminal C (step S103). The remote communication management system 50 informs the client terminals A and B that a participant is to be added (step S104, step S105). The participation in the session is enabled by adding information on the communication terminal C in a session management table, under control of a session managing unit 57 of the remote communication management system 50. Thus, the client terminal A, the client terminal B, and the communication terminal C are now capable of communicating with one another by remote communication (step S106). The communication terminal C is capable of communicating with the client terminals A and B by taking advantage of a messaging mechanism through the remote communication management system 50. Note that the communication terminal C is used not only for participating in the remote communication through audio and video but also for providing a function that is not realized by only the client terminals A and B.

Subsequently, for example, the client terminal B makes a given extended function use request through the remote communication management system 50 to the communication terminal C (step S107, step S108). Then, the communication terminal C performs a given extended function, and makes a response through the remote communication management system 50 to the client terminal B (step S109, step S110). Such a request from the client terminal B may include a case where the client terminal B does not have a sufficient storage, and the client terminal B requests the communication terminal C to record audio and video transmitted and received in the session, in lieu of the client terminal B.

In addition, when the communication terminal C also serves as the external input device 40, the communication terminal C can provide the client terminal A with the screen of document data held by the communication terminal C, so as to let the client terminal B participating in the remote communication on an opposite end view the document data. In this case, when the client terminal B desires to print out the document data on the client terminal B side, it is not efficient to transfer the original document data over the remote communication. For this reason, the client terminal B can ask the communication terminal C to print out the document by utilizing a cloud service, although the details will be described later.

On the other hand, when the communication terminal C makes some kind of a state change request through the remote communication management system 50 to the client terminal B (step S111, step S112), the client terminal B makes a response to the communication terminal C through the remote communication management system 50 (step S113, step S114). Such a request from the communication terminal C may include a case where a lecture is delivered by utilizing the remote communication, and levels of audio inputs and outputs of the client terminals that can be for audiences of the lecture are collectively adjusted.

As a method for making a request or a report to the client terminal B from the communication terminal C, the case where the messaging mechanism of the remote communication management system 50 is utilized has been described. However, such a request or a report can be made in parallel with audio and video signals of the remote communication.

<Printing Out Data by Utilizing Cloud Storage Service>

Figure 9:
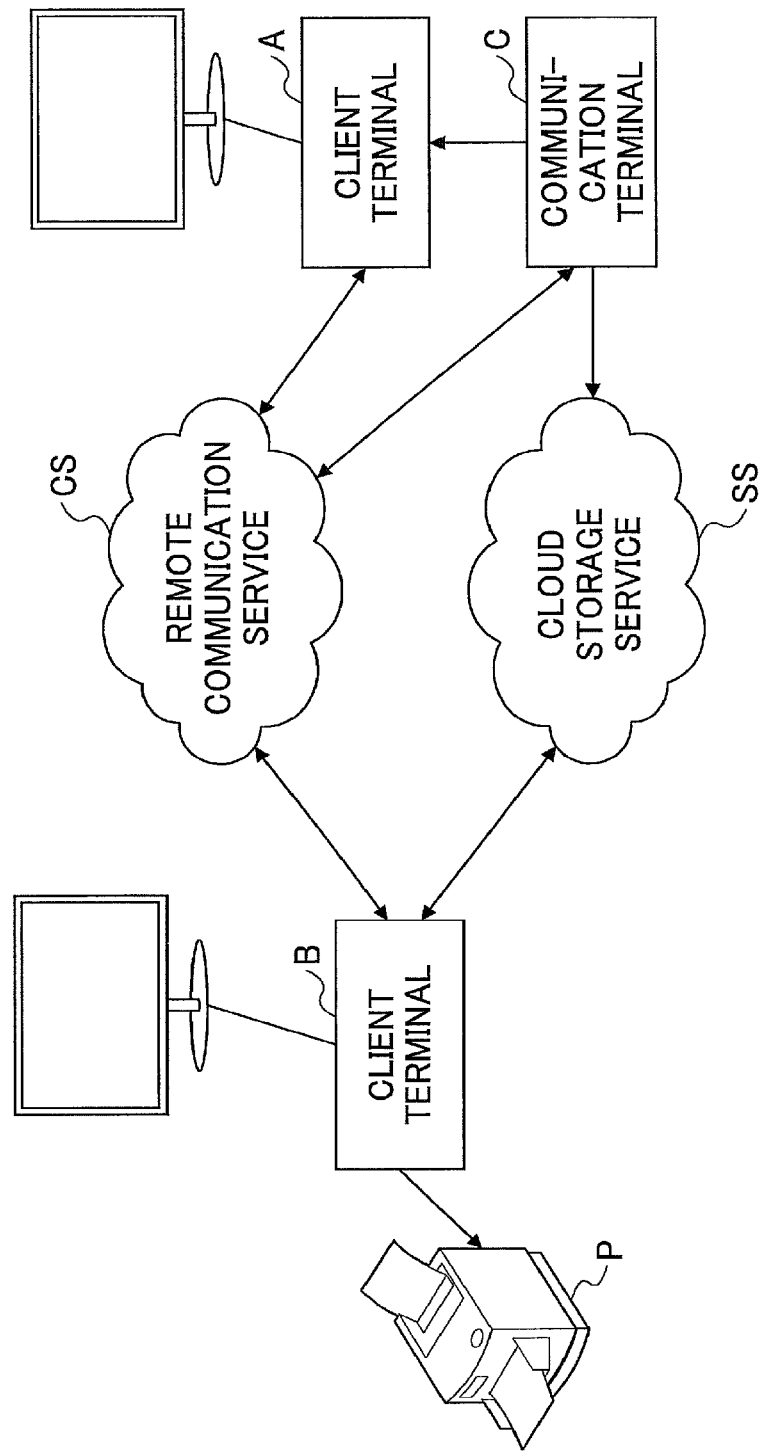
FIG. 9 is a conceptual diagram of printing out data by utilizing a cloud storage service.

FIG. 9 is a conceptual diagram of printing out data by utilizing a cloud storage service. The cloud storage service includes a service that allows data to be stored on a network and that also allows data to be acquired in accordance with a request.

In FIG. 9, the client terminals A and B are remotely communicating with each other by utilizing a remote communication service CS in a remote communication system. To the communication terminal C that is participating in the remote communication service CS, the client terminal B makes a request for document data through the remote communication service CS to print out the document data. Then, the communication terminal C stores the requested document data in a cloud storage service SS. The client terminal B acquires the document data from the cloud storage service SS, and then prints out the document data on a printer P. The cloud storage service SS can store the document data, and can also have a function of storing (i.e., spooling) the processed data immediately before being printed and providing the processed data.

Figure 10:
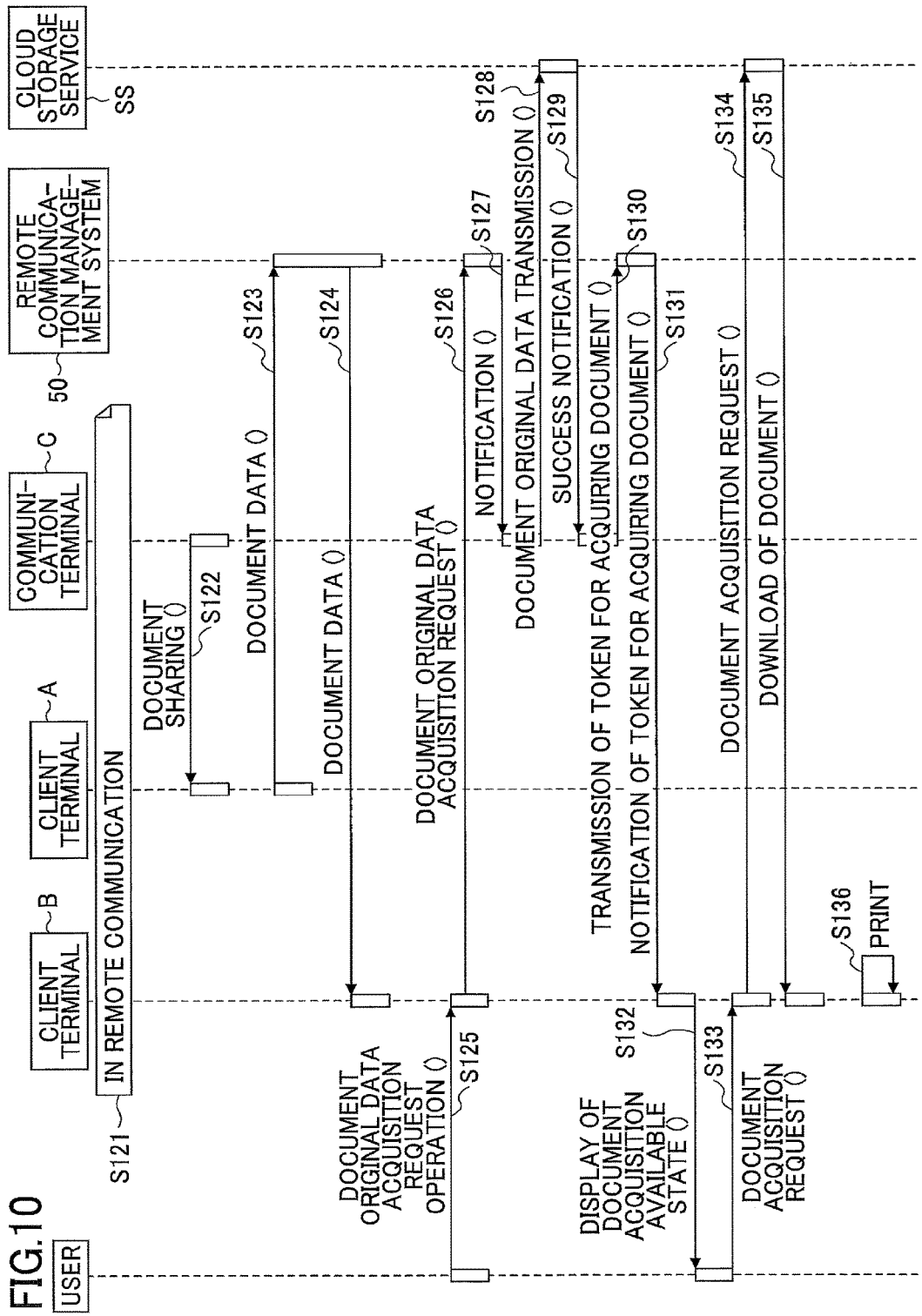
FIG. 10 is a sequence chart illustrating a process example.

FIG. 10 is a sequence chart of a process example. It is assumed that the communication terminal C that also serves as the external input device 40 is coupled to the client terminal A, and the client terminal A and the communication terminal C are used by an identical user.

In FIG. 10, it is assumed that the communication terminal C participates in the session between the client terminals A and B. The client terminal A, the client terminal B, and the communication terminal C are capable of participating in the remote communication (step S121). In this state, when the communication terminal C shares the document (together with screen data of the document) with the client terminal A (step S122), the client terminal A transmits the document data (i.e., screen data) through the remote communication management system 50 to the client terminal B (step S123, step S124).

When the user of the client terminal B makes an operation for a document original data acquisition request for printing out original data of the document (step S125), the client terminal B makes a document original data acquisition request through the remote communication management system 50 to the communication terminal C (step S126, step S127).

On receiving the request, the communication terminal C transmits original data of the document to the cloud storage service SS (step S128). When the data is normally received, the communication terminal C receives a success report (step S129). It is assumed that such a success report includes a token for document acquisition to be used for acquiring the data from the cloud storage service SS.

Subsequently, the communication terminal C transmits the token for document acquisition through the remote communication management system 50 to the client terminal B (step S130, step S131). Then, the client terminal B displays to the user that the document is in an acquirable state, together with the token for document acquisition (step S132). In response to this, the user operates the client terminal B to make a document acquisition request (step S133). Then, the client terminal B makes a document acquisition request to the cloud storage service SS (step S134), downloads the document data (step S135), and prints out the document on the printer P (step S136).

<Printing Out Data by Utilizing Cloud Print Service>

Figure 11:
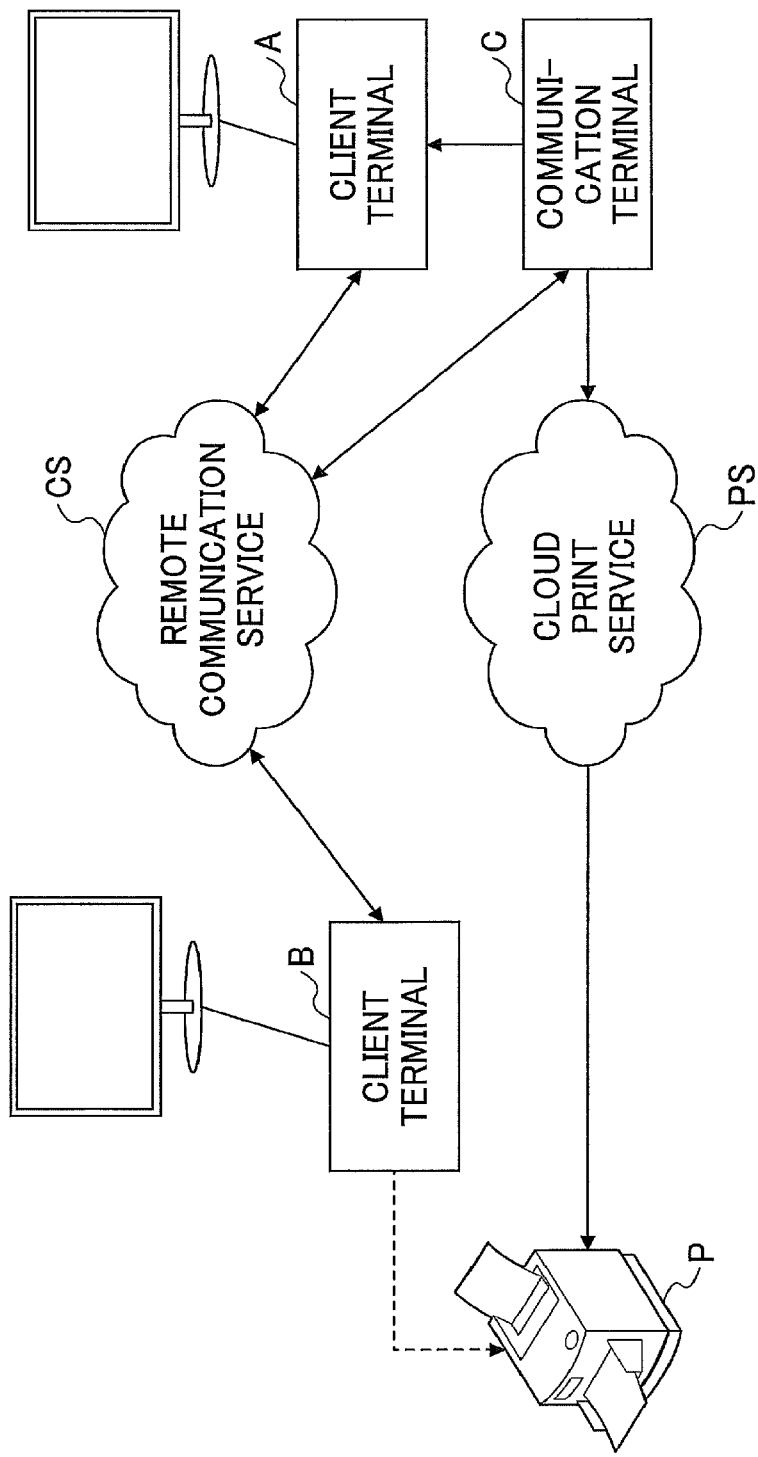
FIG. 11 is a conceptual diagram of printing out data by utilizing a cloud print service.

FIG. 11 is a conceptual diagram of printing out data by utilizing a cloud print service. The cloud print service is a service that enables data to be printed out at any printer. The printer is designated by loading the data to be printed out into a network.

In FIG. 11, the client terminals A and B are communicating with each other through the remote communication service CS in a remote communication system. To the communication terminal C that is participating in the remote communication service CS, the client terminal B requests the cloud print through the remote communication. The communication terminal C loads a print job onto the cloud print service PS. The printer P receives the data from the cloud print service PS, and turns the data into a printable state. Then, the user of the client terminal B presents the token for document acquisition, and then the printer P prints out the data.

Figure 12:
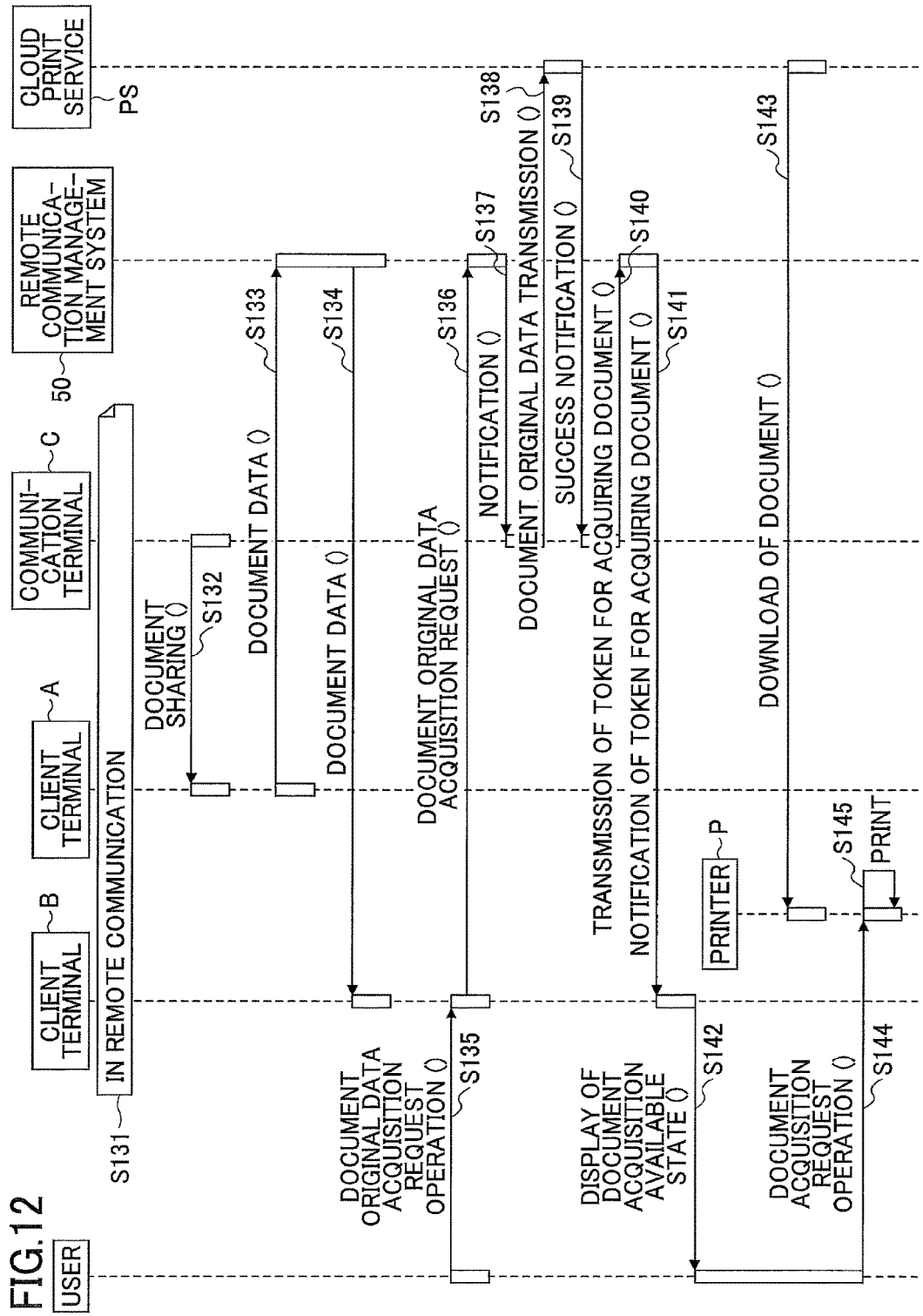
FIG. 12 is a sequence chart of a process example.

FIG. 12 is a sequence chart of a process example. The communication terminal C also serves as the external input device 40, and is coupled to the client terminal A. It is assumed that the communication terminal C and the client terminal A are used by the same user.

In FIG. 12, the communication terminal C participates in the session established between the client terminals A and B. Then, the client terminal A, the client terminal B, and the communication terminal C are now capable of communicating with one another by remote communication (step S131). In this state, the communication terminal C shares a document (together with screen data of the document) with the client terminal A (step S132). Then, the client terminal A transmits the document data (e.g., screen data) through the remote communication management system 50 to the client terminal B (step S133, step S134).

The user of the client terminal B operates the client terminal B to designate the printer P and make a print request for printing original data of the document (step S135). Then, the client terminal B makes a document original data print request through the remote communication management system 50 to the communication terminal C (step S136, step S137).

On receiving the print request, the communication terminal C transmits the original data of the document to the cloud print service PS (step S138). When the document is normally received, the communication terminal C receives a success report (step S139). It is assumed that such a success report includes the token for document acquisition, which is used for acquiring a printed material.

Next, the communication terminal C transmits the token for document acquisition through the remote communication management system 50 to the client terminal B (step S140, step S141). Then, the client terminal B displays to a user that the document can be printed, together with the token for document acquisition (step S142).

The printer P downloads the document data from the cloud print service PS (step S143), and is waiting in a printable state.

Now, the user presents the token for document acquisition to the printer P and makes an operation for a document print request (step S144). Then, the printer P prints out the document (step S145).

In the above description, the case where the document is printed out in response to a request from the client terminal B has been described. However, instead of printing out the document, any other request may be given. For example, the document may be transmitted via e-mail instead of being printed out, or a request for changing a page in the document may be transmitted.

CONCLUSION

As described heretofore, in the present embodiment, a function that is not achieved by only client terminals establishing remote communication can be provided to a user of the remote communication, by using a communication terminal that is not directly establishing remote communication.

Heretofore, embodiments of the present invention have been described. Specific examples have been illustrated for describing the present invention. However, the present invention is not limited to these embodiments, but various variations and modifications may be made without departing from the scope of the present invention. In other words, it should be understood that the present invention is not limited by the detailed description of the examples and accompanied drawings.

Correspondence of Terms in Embodiments and Terms in Claims

The client terminal A is an example of a "first communication terminal". The client terminal B is an example of a "target communication terminal" to be in communication with the first communication terminal. The communication terminal C is an example of a "second communication terminal".

What is claimed is:
1. A remote communication system comprising:
a first communication terminal having processing circuitry configured to establish a session for transmitting and receiving at least voice data and image data with a target communication terminal via a network, and to communicate with the target communication terminal; and a second communication terminal having processing circuitry configured to participate in the session via the network and also be configured to be coupled to the first communication terminal as an external input device, the second communication terminal providing one of the first communication terminal and the target communication terminal with execution of a given function related to a document that is stored on the second communication terminal, by performing communication with a separate cloud service over the network, and where image data of the document is shared with the first communication and the target communication terminal during the session, where the execution of the given function is not directly available to be performed by the one of the first communication terminal and the target communication terminal, and is in response to a request from one of a user of the second communication terminal, the first communication terminal, and the target communication terminal.

2. The remote communication system according to claim 1, wherein the second communication terminal provides the image data of a document to the first communication terminal, and performs a mediating process for printing original data of the document in response to the request from the target communication terminal.

3. The remote communication system according to claim 2, wherein in response to the request from the target communication terminal, the second communication terminal stores the original data of the document in a cloud storage service as the cloud service, acquires a token for acquiring the original data from the cloud storage service, and informs the target communication terminal of the token.

4. The remote communication system according to claim 2, wherein in response to the request from the target communication terminal, the second communication terminal transmits the original data of the document to a cloud print service as the cloud service, acquires a token for acquiring a printed material from the cloud print service, and informs the target communication terminal of the token.

5. A communication terminal comprising:
processing circuitry configured to
participate in a session for transmitting and receiving at least voice data and image data, the session being established between a first communication terminal and a target communication terminal, where the communication terminal is configured to be coupled to the first communication terminal as an external input device; and provide one of the first communication terminal and the target communication terminal with execution of a given function related to a document that is stored on the communication terminal, by performing communication with a separate cloud service over the network, and where image data of the document is shared with the first communication and the target communication terminal during the session, where the execution of the given function is not directly available to be performed by the one of the first communication terminal and the target communication terminal, and is in response to a request from one of a user of the second communication terminal, the first communication terminal, and the target communication terminal.

6. A remote communication method performed by processing circuitry of a second communication terminal, the remote communication method comprising:

participating in a session for transmitting and receiving at least voice data and image data, the session being established between a first communication terminal and a target communication terminal, wherein the second communication terminal is also coupled to the first communication terminal as an external input device; and providing one of the first communication terminal and the target communication terminal with execution of a given function related to a document that is stored on the second communication terminal, by performing communication with a separate cloud service over the network, and where image data of the document is shared with the first communication and the target communication terminal during the session, where the execution of the given function is not directly available to be performed by the one of the first communication terminal and the target communication terminal, and is in response to a request from one of a user of the second communication terminal, the first communication terminal, and the target communication terminal.

* * * * *